United States Patent
Wang et al.

(10) Patent No.: US 9,191,362 B2
(45) Date of Patent: Nov. 17, 2015

(54) DETERMINING THE TYPE OF UPSTREAM NETWORK ADDRESS TRANSLATION FROM A HOME GATEWAY

(75) Inventors: Dan Wang, Irvine, CA (US); Allen J. Huotari, Garden Grove, CA (US)

(73) Assignee: Cisco Technology, Inc., San Jose, CA (US)

( * ) Notice: Subject to any disclaimer, the term of this patent is extended or adjusted under 35 U.S.C. 154(b) by 97 days.

(21) Appl. No.: 13/533,626

(22) Filed: Jun. 26, 2012

(65) Prior Publication Data
US 2013/0346629 A1 Dec. 26, 2013

(51) Int. Cl.
*G06F 15/16* (2006.01)
*H04L 29/12* (2006.01)

(52) U.S. Cl.
CPC ........ *H04L 61/2546* (2013.01); *H04L 61/2532* (2013.01); *H04L 61/2015* (2013.01); *H04L 61/2514* (2013.01)

(58) Field of Classification Search
CPC ............ H04L 61/2015; H04L 61/2532; H04L 29/12226; H04L 61/1511; H04L 61/2557; H04L 69/167
USPC ........................................................ 709/245
See application file for complete search history.

(56) References Cited

U.S. PATENT DOCUMENTS

| | | | |
|---|---|---|---|
| 8,040,819 B2 | 10/2011 | Harrington et al. | |
| 8,122,113 B2 | 2/2012 | Harrington et al. | |
| 8,635,314 B2* | 1/2014 | Droms et al. | 709/222 |
| 9,049,273 B2* | 6/2015 | Grundemann et al. | 1/1 |
| 2004/0103213 A1* | 5/2004 | Park | 709/245 |
| 2008/0005345 A1* | 1/2008 | Roberts et al. | 709/230 |
| 2009/0207843 A1* | 8/2009 | Andreasen et al. | 370/392 |
| 2011/0055928 A1* | 3/2011 | Brindza | 726/26 |
| 2011/0314181 A1* | 12/2011 | Guo | 709/245 |
| 2012/0311185 A1* | 12/2012 | Li | 709/245 |
| 2013/0254423 A1* | 9/2013 | George, IV | 709/238 |

OTHER PUBLICATIONS

Droms, R., et al., Dynamic Host Configuration Protocol, Internet Engineering Task Force (IETF), Request for Comments (RFC) 2131, Mar. 1997, pp. 1-45, Bucknell University.

(Continued)

*Primary Examiner* — Kevin Bates
*Assistant Examiner* — Nazia Naoreen
(74) *Attorney, Agent, or Firm* — Haynes and Boone, LLP

(57) ABSTRACT

Methods and systems are provided for assisting installation of network devices including determining the type (e.g., consumer grade or Carrier Grade) of an upstream Network Address Translation (NAT) device in a double NAT environment (e.g., Large Scale NAT or NAT444) and automatically enabling or disabling NAT or bridging in the network device as may be needed or desired according to attributes that are deduced about the upstream network device. An example of a method includes: broadcasting a Dynamic Host Control Protocol (DHCP) DISCOVER packet to an upstream network; receiving a DHCP OFFER from an upstream Network Address Translation (NAT) device in response to the DHCP DISCOVER packet; deducing attributes of the upstream NAT device with assistance of information from the received DHCP OFFER; and determining whether or not to disable Network Address Translation and bridge to the upstream network according to the deduced attributes.

20 Claims, 3 Drawing Sheets

(56) References Cited

OTHER PUBLICATIONS

Patrick, M., DHCP Relay Agent Information Option, Internet Engineering Task Force (IETF), Request for Comments (RFC) 3046, Jan. 2011, pp. 1-14, Motorola BCS.

Stapp, M., et al., Vendor-Specific Information Suboption for the Dynamic Host Configuration Protocol (DHCP) Relay Agent Option, Internet Engineering Task Force (IETF), Request for Comments (RFC) 4243, Dec. 2005, pp. 1-7, Cisco Systems, Inc.

Rekhter, Y., et al., Address Allocation for Private Internets, Internet Engineering Task Force (IETF), Request for Comments (RFC) 1918, Feb. 1996, pp. 1-9, Silicon Graphics, inc.

Blanchet M., et al., Special-Use IPv6 Addresses, Internet Engineering Task Force (IETF), Request for Comments (RFC) 5156, Apr. 2008, pp. 1-7, Viagenie.

\* cited by examiner

DETERMINING THE TYPE OF UPSTREAM NETWORK ADDRESS TRANSLATION FROM A HOME GATEWAY

TECHNICAL FIELD

The present disclosure generally relates to Network Address Translation (NAT) in communication networks and, more particularly, to simplifying home network gateway installation.

BACKGROUND

In communication networks, a connection between a small home network or Local Area Network (LAN) and a larger network, such as the Internet or a Wide Area Network (WAN), may pass through one or more devices, e.g., a modem or router, generally referred to as a gateway. A gateway may provide a connection to an Internet Service Provider (ISP) and may perform a number of various functions such as providing a firewall and Network Address Translation (NAT) for the LAN. Network Address Translation can be used to allow multiple devices with "private" Internet Protocol (IP) addresses on the LAN to share a "public" IP address on the WAN by a process of modifying IP address information in IP packet headers while in transit across a traffic routing device, e.g., a gateway or router. For example, as network traffic (e.g., data packets) passes from the local network to the Internet, the source address in each packet may be translated on the fly from a private address to the public address. The NAT device (e.g. gateway or router) may track packet data about each active connection (particularly the destination address and port) so that, when a reply returns to the NAT device, the NAT uses the connection tracking data it stored during the outbound phase to determine the private address on the internal network to which to forward the reply. (When using the port information, NAT is also referred to as NAPT—Network Address and Port Translation. As used herein, NAT shall refer to both or either of NAT and NAPT unless otherwise specifically noted.) By allowing multiple devices on "private" IP address subnets (such as the LAN in the preceding example) to share "public" addresses, NAT has extended the capabilities of the Internet Protocol version 4 (IPv4) addressing scheme, which might otherwise have run out of available IP addresses long ago (referred to as "address exhaustion").

The imminent exhaustion of Internet Protocol version 4 (IPv4) address space has Internet Service Providers considering the use of Carrier Grade NAT (CGN), also known as Large Scale NAT (LSN) or NAT444, depending on the various implementations. For example, one use of CGN is known as NAT444 because some customer's connections to public servers may pass through three different IPv4 addressing domains: the customer's own private network, the carrier's private network, and the public Internet. (Conventional NAT is now sometimes referred to as NAT44 by comparison). Carrier Grade NAT (NAT444, LSN) has been proposed as an approach for mitigating IPv4 address exhaustion, and easing the transition to IPv6. A typical application of NAT 444 (or LSN) provides a way of permitting the sharing of relatively small pools of public addresses among many end sites—e.g., a residential Local Area Network (LAN) connected to an operator's (e.g., Internet Service Provider) network via a home (customer premises) network gateway—with Network Address Translation between the ISP's network and the public IPv4 addresses being provided by Network Address Translation devices (e.g., Carrier Grade NAT devices) embedded in the network operator's (or ISP) network. Two levels of Network Address Translation are, thus, provided so that a NAT444 or LSN network configuration may be referred to as a double NAT environment.

DESCRIPTION

Overview

Figure 1:
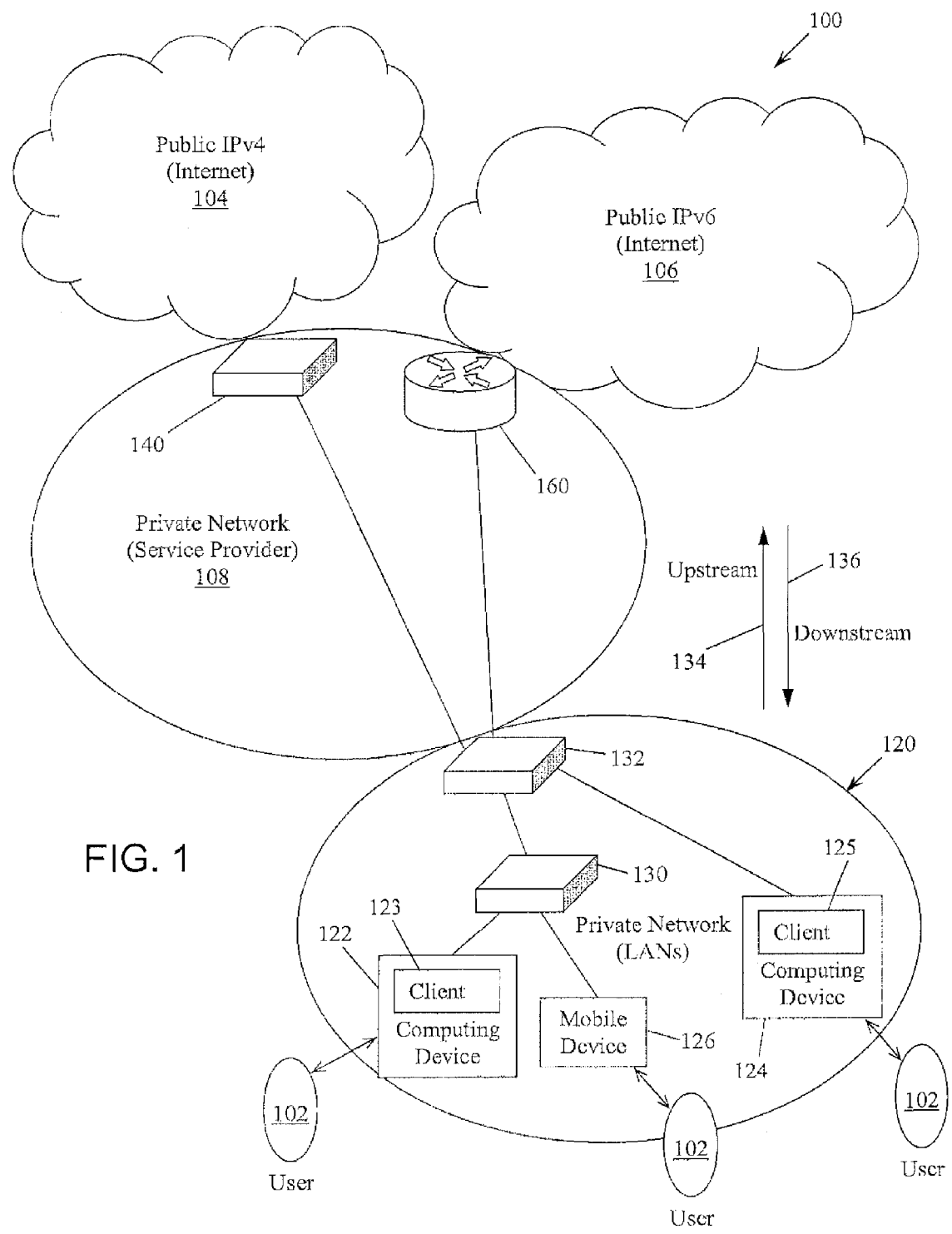
FIG. 1 is a system diagram illustrating a communication network in accordance with one or more embodiments.

In accordance with one or more embodiments, methods and systems are provided for: broadcasting a Dynamic Host Control Protocol (DHCP) DISCOVER packet to an upstream network; receiving a DHCP OFFER from an upstream Network Address Translation (NAT) device in response to the DHCP DISCOVER packet; deducing attributes of the upstream NAT device with assistance of information from the received DHCP OFFER; and determining whether or not to disengage Network Address Translation and bridge to the upstream network according to the deduced attributes.

DESCRIPTION OF EXAMPLE EMBODIMENTS

In accordance with embodiments, methods and systems are provided that may simplify or aid installation of customer premises equipment (CPE) such as a home network gateway for a non-technically oriented consumer customer. For example, a home gateway device may include a router and have a capability for Network Address Translation (NAT) such that, during installation, the gateway device may be able to automatically enable or disable NAT and enable or disable bridging (also referred to as bridge mode, in which, basically, data packets pass through the device unaltered, without NAT) to the upstream network. If automatic bridging is engaged, e.g., for the home gateway device being installed, in a double NAT environment, e.g., Large Scale NAT (LSN) or NAT444, the home gateway could be bridged to the upstream NAT44 subnet, e.g., the ISP network, which is not desirable. Sensing or deducing conditions about the upstream network such as the type of upstream NAT—e.g., whether consumer grade (e.g., conventional NAT) or Carrier Grade NAT is present upstream of the home gateway being installed—can be important for determining whether or not to initiate or continue bridging in the device being installed.

Embodiments may differ from known mechanisms that mainly detect the presence and the behavior of upstream NAT in that embodiments may confer an advantage of seeking to identify how (e.g., consumer vs. Large Scale) the NAT is being used, and who (e.g., what device manufacturer) deployed the NAT. For example, Session Traversal Utilities for NAT (STUN), Traversal Using Relay NAT (TURN), and Interactive Connectivity Establishment (ICE) provide various mechanisms and protocols for traversing NAT, but each of these can be complex to use for discovering a double NAT environment and may not reliably find a double NAT when it exists. Moreover, these technologies do not provide a way to identify whether the NAT is a Carrier Grade NAT (CGN). Also for example, use of Universal Plug and Play (UPnP) with Internet Gateway Device (IGD) protocol generally focuses on in-home or residential gateway devices (e.g., consumer grade NAT), providing a more automatic way to configure the gateway to allow traffic through, e.g., providing NAT traversal for applications using peer-to-peer networks, multiplayer gaming, and remote assistance programs. Normally, UPnP IGD is not seen in a Carrier Grade NAT or LSN network so CGN is not detectable using UPnP IGD methods.

FIG. 1 illustrates a system 100 for use with a communication network, in accordance with one or more embodiments. As seen in FIG. 1, any of users 102 may wish to connect to a public network—such as public network 104, which may use Internet Protocol version 4 (IPv4) addressing and may include the Internet, or public network 106, which may use Internet Protocol version 6 (IPv6) addressing and may include the Internet—via an operator's or service provider's network 108, which may be a private network operated, for example, by an Internet Service Provider (ISP) or a Broadband Access Network provider, and may use either or both IPv4 or IPv6 addressing. Service provider network 108 may communicate with public IPv6 network 106 and IPv6 portions of the Internet via a routing network device 160, which may be, for example, a peer router or dual stack router, as known in the art.

Service provider network 108 may communicate with public IPv4 network 104 and IPv4 portions of the Internet via a routing network device 140, which may be, for example, a Large Scale NAT (LSN) device or Carrier Grade NAT (CGN) device (e.g., Carrier Grade router). Routing network device 140 may—for example, implementing Large Scale or Carrier Grade NAT—use non-globally-unique (e.g., localized) IPv4 addresses on the more local (compared to IPv4 network 104, e.g., wide area network (WAN) or Internet) service provider network 108, and use only globally-unique addresses on public IPv4 network 104 to enable communication between local area networks 120 (connected to service provider network 108 via network device 132, e.g., a consumer grade router) and public IPv4 network 104. Thus, deploying Large Scale or Carrier Grade NAT (using for example a number of CGN or LSN routing network devices 140 embedded throughout network 108) may allow the Internet Service Provider operating service provider network 108 to provide communication with public IPv4 network 104 for a relatively large number of hosts—such as networking device 132—using a much smaller number of globally unique (public) IPv4 addresses. Such deployment of CGN or LSN may help mitigate or delay IPv4 address space exhaustion—which may be thought of as the depletion of the pool of unallocated IPv4 addresses resulting from IPv4 addressing not being able to provide a sufficient number of publicly routable addresses to provide a distinct address for every Internet device or service desiring to connect to the Internet.

Users 102 may connect to service provider network 108 using a computing device 122 or 124, or mobile device 126 (e.g., a computer, cell phone, computing tablet, or other consumer electronic device) via one or more local area networks (LANs) 120 established by network devices 130, 132, for example, as seen in FIG. 1. Network devices 130, 132 may be home gateway devices that may include a router as well as other processing and networking capabilities. Each of network devices 130, 132 may be capable, for example, of operating in either bridge mode (e.g., with NAT turned off, or disabled) or with bridging turned off or disabled (e.g., operating with NAT engaged).

In the example configuration shown in FIG. 1, it may be desirable for network device 130 to operate in bridge mode, e.g., to bridge computing device 124 and mobile device 126 to network device 132, also referred to as bridging to the upstream network. (Upstream and downstream directions are indicated in FIG. 1 by upstream direction arrow 134 and downstream direction arrow 136.) Likewise, in this same example, it may also be desirable for network device 132 to operate with NAT engaged in order to share a pool of private addresses among devices 122, 124, 126, and 130 so that a relatively large number of devices (e.g., devices 122, 124, 126, 130) using private addresses in LANs 120 can connect to the upstream network 108 while using a smaller number (e.g., one, for device 132) of upstream addresses (public or private address) in upstream service provider network 108.

When installing a new router or gateway, such as network device 130 or network device 132, into a network, it may not be readily apparent, either to the person installing or the device itself, whether the device will be connected directly to service provider network 108, in a situation similar to that of network device 132, or whether the device will be connected indirectly to service provider network 108 through a LAN to form a sub-network of a LAN such as LAN 120, in a situation similar to that of network device 130.

In the situation of network device 132, connecting directly to service provider network 108, the network device being installed will most likely connect upstream to a Carrier Grade (CGN or LSN) routing device such as routing network device 140. In that situation, e.g., the device upstream of the device being installed is a Carrier Grade NAT device, it may be desired to enable NAT and disable bridging.

In the situation of network device 130, connecting to service provider network 108 indirectly as part of a LAN such as LAN 120, the network device being installed will most likely connect upstream to a consumer grade routing device such as network device 132. In that situation, e.g., the device upstream of the device being installed is a consumer grade NAT device, it may be desired to disable NAT and enable or initiate bridging.

Therefore, it may be useful for the network device being installed, in order to determine whether to enable or disable NAT or bridging, to be able to distinguish what situation it is being installed in. Embodiments may provide that ability by enabling the network device to determine attributes of and make deductions about the upstream router to which it may be connecting, e.g. whether the upstream router is Carrier Grade (LSN or CGN) or consumer grade NAT.

Both network devices 130 and 132 may operate using Dynamic Host Configuration protocol (DHCP). DHCP is described, for example, by a document entitled "Dynamic Host Configuration Protocol", promulgated as Internet Engineering Task Force (IETF) Request For Comments (RFC) 2131 (IETF-RFC 2131). Each of network devices 130 and 132 may include either or both of a DHCP client or DHCP server and may use DHCP for communication with computing devices 122, 124 and mobile device 126. Computing devices 122, 124 may thus include, respectively, a DHCP client 123, 125, as shown in FIG. 1; mobile device 126, as well, may include a DHCP client (not shown).

Figure 2:
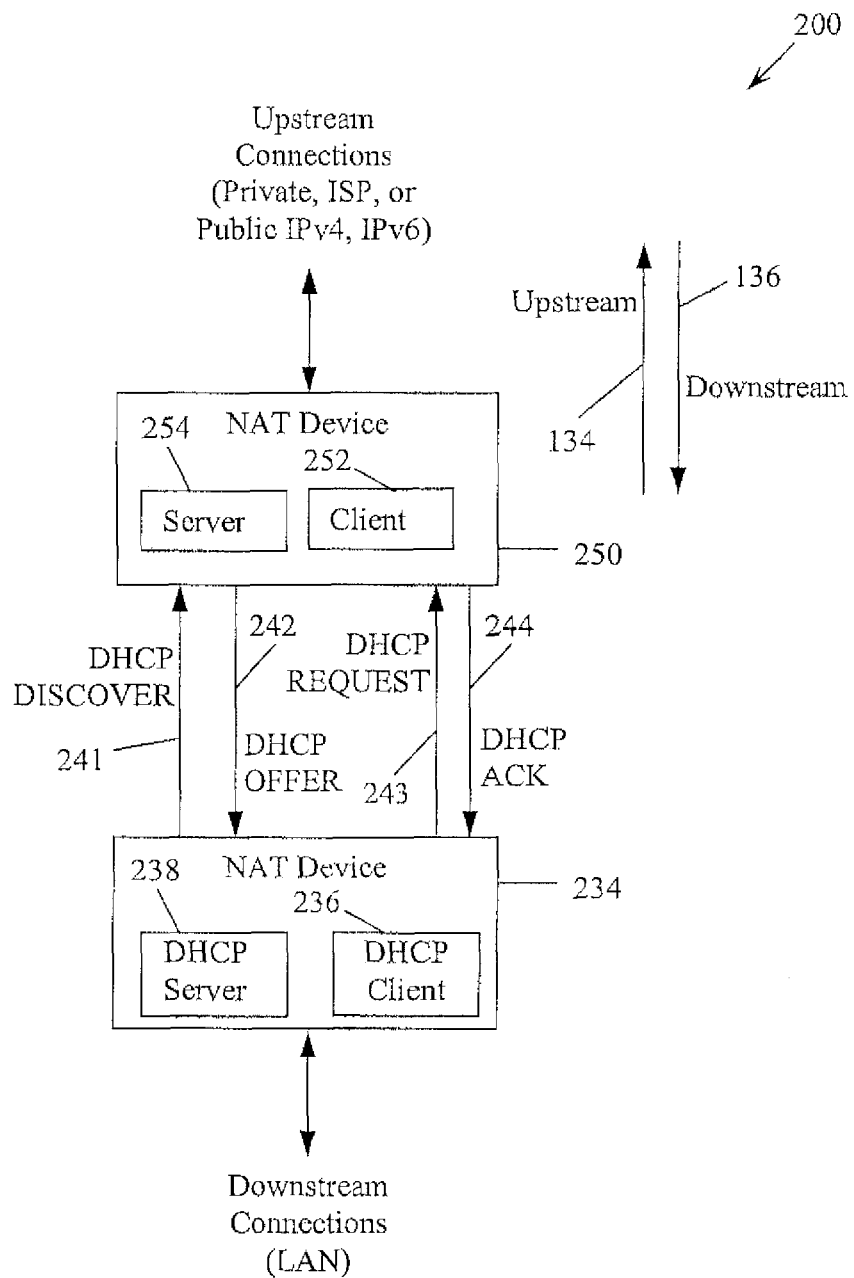
FIG. 2 is a system diagram illustrating network devices that may form a portion of the network illustrated in FIG. 1, in accordance with one or more embodiments.

FIG. 2 illustrates a system 200, in accordance with one or more embodiments, that may form a portion of the system 100 illustrated in FIG. 1. As shown in FIG. 2, NAT device 250 may be a Large Scale NAT or Carrier Grade NAT device such as routing network device 140, shown in FIG. 1, or a consumer grade NAT device such as network device 132, shown in FIG. 1, e.g., a consumer grade router or home gateway. NAT device 234, however, as also shown in FIG. 2, may be a consumer grade NAT device, e.g., a consumer grade router or home gateway such as either of network device 132 or network device 130, shown in FIG. 1.

In case NAT device 234 may be disposed in a network similarly to network device 132, NAT device 234 may be connected to an upstream wide area network such as service provider network 108, and may connect to a downstream LAN 120. (Upstream and downstream directions are indicated in both FIG. 1 and FIG. 2 by upstream direction arrow 134 and downstream direction arrow 136.) In this case it may be desired for NAT device 234 not to bridge to the upstream network, and to provide NAT between the upstream network (e.g., service provider network 108) and the downstream network (e.g., LAN 120).

Alternatively, in case NAT device 234 may be disposed in a network similarly to network device 130, NAT device 234 may be connected to an upstream LAN such as LAN 120, and may connect to a downstream LAN (e.g., part of LAN 120). In this case it may be desired for NAT device 234 to bridge to the upstream network, and not to provide NAT between the upstream network (e.g., LAN 120) and the downstream network (e.g., part of LAN 120).

It may be seen in either case that NAT device 234 may be installed in a double NAT environment and that it may be useful, for the purpose of NAT device 234 to determine its mode of operation, for NAT device 234 to acquire information about and make deductions about the attributes and operation of NAT device 250. For example, NAT device 234 (e.g., a home gateway device) may have a capability to automatically disable NAT, based on what the mode of operation should be, which it then needs to determine in order to use the capability effectively.

Like network devices 130 and 132, network devices 250 and 234 may operate using DHCP. Each of network devices 130 and 132 may include either or both of a DHCP client (252, 236) or DHCP server (254, 238) that supports a framework for providing configuration parameters between Internet hosts including a method of delivering host-specific configuration parameters, and a mechanism for allocating network addresses to network hosts. As used herein, a DHCP client is an Internet host or network node that is configured to use DHCP to obtain configuration parameters such as a network address, and a DHCP server is an Internet host that is configured to return configuration parameters to a DHCP client. However, a DHCP client and server are not limited to these.

In one example, NAT device 234 may broadcast an initiating packet, e.g., DHCP DISCOVER 241, upstream to NAT device 250. The upstream NAT device 250 may respond with a DHCP OFFER 242. The DHCP OFFER 242 may include, for example, a source media access control (MAC) address and a network IP address. In this example, the transaction may be completed by NAT device 234 sending a DHCP REQUEST 243, and NAT device 250 responding with a DHCP ACK 244.

By examining the source MAC address of the DHCP OFFER 242, NAT device 234 may be able to acquire or deduce enough information about the attributes of NAT device 250 to, for example, make an assumption (in case the information makes it relatively uncertain) or a deduction or determination (in case the information makes it relatively certain) about whether or not upstream device 250 is a consumer grade NAT or a Large Scale NAT device. Relative certainty can be determined, for example, based on a scoring system that assigns scores to various pieces of information, combines the scores according to various rules to get a final score, and makes a decision based on the final score, e.g., a percentage score in which 50% or greater, for example, could be considered relatively certain.

For example, the NAT device 234 (e.g., a home gateway) may examine the source MAC address of the DHCP OFFER 242, which ordinarily may be the MAC address of the device, e.g., NAT device 250, sending the DHCP OFFER 242. A MAC address generally provides a unique identifier for a network interface (e.g., a network interface card in the hardware of NAT device 234). MAC addresses may be universally administered and typically are assigned by the manufacturer of a device such as a network interface card (NIC) and stored in the card's hardware, read-only memory, or firmware, for example. If assigned by the manufacturer, a MAC address may encode the manufacturer's registered identification number. The first three octets (e.g., bytes, in transmission order) may identify the organization (e.g., device manufacturer) that issued the identifier and are known as the organizationally unique identifier (OUI). The remaining octets of the MAC address may be assigned by the organization subject to the constraint of uniqueness. A network node (e.g., any device connected to a network) may have multiple NICs and may have one unique MAC address per NIC.

NAT device 234 may store, and keep updated, a list of GUIs of device manufacturers. NAT device 234 may compare the first three octets of the source MAC address of the DHCP OFFER 242 to the list of OUIs and may, upon finding a match, determine the manufacturer of the upstream NAT device 250. The list of OUIs NAT device 234 (e.g., home gateway) stores can be, for example, a list of well-known consumer home networking device manufacturers. From the result of the comparison, e.g., finding a match between the list and the MAC address of the DHCP OFFER 242, the NAT device 234 (e.g., home gateway) may determine whether or not to turn off its NAT and bridge to the upstream network (e.g., bridge to NAT device 250).

In addition, the NAT device 234 (e.g., home gateway) may attempt to discover consumer grade services that, for example, are normally used for consumer grade device configurations—such as Universal Plug and Play (UPnP), or a HyperText Transfer Protocol (HTTP) server. If consumer grade services are present in the upstream network, the NAT device 234 (e.g., home gateway) may assume, deduce, or determine (as described above) that the upstream NAT is deployed by a consumer grade NAT device. The home gateway will only bridge when it is relatively certain that upstream device is a consumer grade device and not LSN.

Furthermore, in addition to information and deductions that may be made from the organizationally unique identifier, MAC address, and the consumer grade services check, the NAT device 234 (e.g., home gateway) may examine the IP address received in the DHCP OFFER 242.

In the Internet addressing architecture, standards for addressing private networks using private IP address space, have been set by Internet Engineering Task Force Request For Comments documents RFC 1918 and RFC 4193. Private IP addresses may be characterized as not being allocated to any specific organization so that anyone may use these addresses without approval from a Regional Internet Registry (RIR). IP packets addressed by private addresses cannot be transmitted onto the public Internet (e.g., public network 104, 106) so that if a private network needs to connect to the Internet, it must use either a network address translator (NAT) gateway or a proxy server. Private IP addresses are commonly used for home, office, and enterprise local area networks (LANs) and may be considered to have helped delay IPv4 address exhaustion.

According to RFC 1918 there is a 24-bit block, a 20-bit block, and a 16-bit block for IPv4 IP addresses. The 24-bit block covers addresses in the range of 10.0.0.0-

10.255.255.255; the 20-bit block covers addresses in the range of 172.16.0.0-172.31.255.255; and the 16-bit block covers addresses in the range of 192.168.0.0-192.168.255.255.

If the DHCP OFFER 242 received by the NAT device 234 (e.g., home gateway) contains an IP address (also referred to as the IP address being offered) in the 16-bit block of RFC 1918 IP addresses, then NAT device 234 can be relatively certain that the upstream device, NAT device 250, is a consumer grade device. Thus, in this case NAT device 234 may operate in bridge mode and not perform Network Address Translation.

If the IP address being offered in the DHCP OFFER 242 is an address in the 20-bit or 24-bit blocks of RFC 1918 IP addresses, then NAT device 234 may assume the IP address being offered to be from a Large Scale or Carrier Grade NAT device (e.g., that NAT device 250 is a CGN or LSN device) until the NAT device 234 (e.g., home gateway) can be certain (e.g., as described above) that the upstream NAT device 205 is not an LSN device. Thus, in this case NAT device 234 may perform Network Address Translation and not operate in bridge mode.

Figure 3:
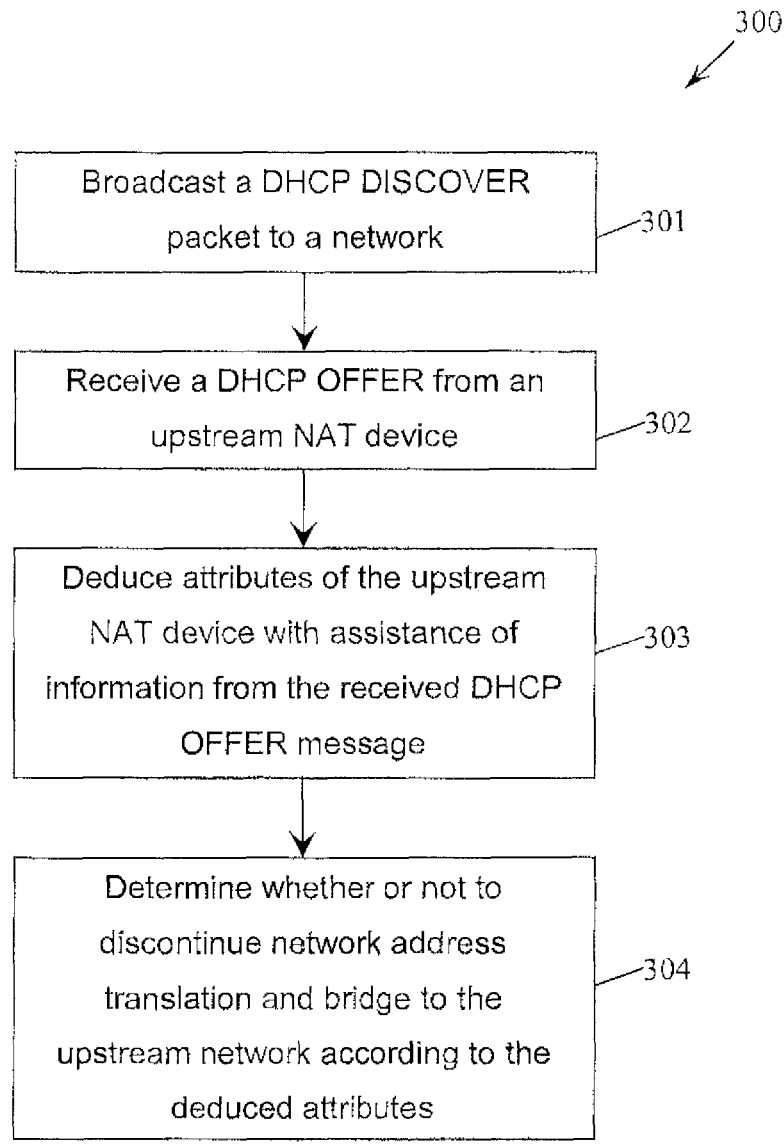
FIG. 3 is a process flow diagram illustrating a method in accordance with one or more embodiments.

FIG. 3 illustrates a method 300, in accordance with one or more embodiments, that may be performed by a network device to find out, for example, if it is situated in a Large Scale NAT or double NAT environment. Method 300 may be implemented in a device, for example network device 130, 132, or 234, in which the described functions and operations may be implemented using hardware, or a combination of hardware with firmware, software, or both.

At step 301, method 300 may include broadcasting (for example, by a network device 132, 130, or 234) a discover or initiating type of message (e.g., DHCP DISCOVER 241) to a network (e.g., an upstream network such as LAN 120 or ISP network 108).

At step 302, method 300 may include receiving (for example, by a network device 132, 130, or 234) a response or offer type of message (e.g., DHCP OFFER 242) from an upstream NAT device (e.g., an upstream network device such as routing network device 140, network device 132, or NAT device 250). The response message may include, for example, a source MAC address of the source device (e.g., the upstream network device such as routing network device 140, network device 132, or NAT device 250) sending the response message and may also include an offered IP address (e.g., the IP address being offered).

Method 300 may further include storing a list of Organizationally Unique Identifiers. For example, a list of Organizationally Unique Identifiers and their corresponding organizations (e.g., device manufacturers) may be stored in a network device such as network device 132, 130, or 234 at the time of manufacture or a list may be downloaded to the device upon its connection to a network. Method 300 may further include comparing the first three octets of the source MAC address of the response message to the stored list of Organizationally Unique Identifiers and determining a manufacturer of the upstream NAT device based, for example, on finding a match between the OUI octets of the source MAC address and the stored list of Organizationally Unique Identifiers and corresponding device manufacturers and organizations.

At step 303, method 300 may include deducing attributes of the upstream NAT device with assistance of information from the received response message (e.g., DHCP OFFER 242). For example, based on determining a manufacturer of the upstream NAT device from the source MAC address, the network device (e.g., a network device 132, 130, or 234) may deduce, if the manufacturer produces consumer grade devices, that the upstream NAT device (e.g., routing network device 140, network device 132, or NAT device 250) is a consumer grade device, and conversely, if the manufacturer either does not produce consumer grade devices or produces Carrier Grade devices, that the upstream NAT device (e.g., routing network device 140, network device 132, or NAT device 250) is a Carrier Grade or Large Scale NAT device.

Also, for example, the network device (e.g., a network device 132, 130, or 234) may perform operations such as requesting services from an upstream network device (e.g., routing network device 140, network device 132, or NAT device 250) that would only be available with a consumer grade network configuration—such as UPnP, or an HTTP server. In response to finding that consumer grade services are present on the upstream network, the network device (e.g., a network device 132, 130, or 234) may deduce that the upstream NAT is deployed by a consumer grade NAT device (e.g., device 132 or 130) so that bridging to the upstream network may be desired. In response to not finding that consumer grade services are present on the upstream network, the network device (e.g., network device 132 or 130, or 234) may deduce that the upstream NAT is deployed by a Carrier Grade or Large Scale NAT device (e.g., routing network device 140) so that bridging to the upstream network may not be desired.

Also, for example, the network device (e.g., a network device 132, 130, or 234) may examine the IP address being offered in the response message and compare the IP address being offered with the address ranges of the 16-bit, 20-bit, and 24-bit blocks of RFC 1918 IP addresses. If the IF address received from the upstream NAT device is in the 16-bit block of RFC 1918 IP addresses, the network device may deduce that the upstream NAT device is a consumer grade device (e.g., device 132 or 130) so that bridging to the upstream network may be desired. If the IP address received from the upstream NAT device is in the 20 or 24-bit block of RFC 1918 IP addresses, the network device may deduce (or assume until further information implies otherwise) that the upstream device is a Carrier Grade or Large Scale NAT device (e.g., routing network device 140) so that bridging to the upstream network may not be desired.

At step 304, method 300 may include determining whether or not to operate (e.g., turn on or off, initiate or not, continue or discontinue, enable or disable) Network Address Translation and bridge to the upstream network according to the deduced attributes. For example, the network device (e.g., a network device 132, 130, or 234) may bridge to the upstream NAT device (e.g., routing network device 140, network device 132, or NAT device 250) only when relatively certain (e.g., based on a scoring system as described above) or having made a deduction that the upstream device is a consumer grade device and not a Large Scale NAT device. A deduction may be simple or may be as complex as desired, for example, being made based on combining various inferences (e.g., from the MAC address, the IP address, and discovery of services) and weighing the inferences in various ways. For example, one of the MAC address, the IP address, and discovery of services may be regarded as giving a more reliable indicator of the type of upstream NAT or may be given priority in a chain of deductions. Also, the particular type of network device being installed (e.g., network device 234) or where it is being installed may influence the process of deduction to be used.

Therefore, it should be understood that the disclosure may be practiced with modification and alteration within the spirit and scope of the appended claims. The description is not intended to be exhaustive or to limit the disclosure to the precise form disclosed. It should be understood that the disclosure may be practiced with modification and alteration and that the disclosure be limited only by the claims and the equivalents thereof.

What is claimed is:

1. An apparatus comprising:
   an electronic processor configured to communicate over a network; and
   a memory device in communication with the processor, including a computer-readable medium having computer readable code for instructing the processor and, when executed, the processor performs operations comprising:
      broadcasting a Dynamic Host Control Protocol (DHCP) DISCOVER packet to an upstream network;
      receiving a DHCP OFFER from an upstream Network Address Translation (NAT) device in response to the DHCP DISCOVER packet;
      deducing attributes of the upstream NAT device with assistance of information from the received DHCP OFFER; and
      determining, based on making a deduction, according to the deduced attributes, about whether the upstream NAT device is a consumer NAT device or a Large Scale NAT device, whether or not to configure the electronic processor to enable Network Address Translation or bridge to the upstream network.

2. The apparatus of claim 1, wherein the deducing operation further comprises:
   examining a source address of the DHCP OFFER and an IP address offered in the DHCP OFFER; and
   based on the examination, making a deduction about whether the upstream NAT device is a consumer NAT device or a Large Scale NAT device.

3. The apparatus of claim 1, wherein the deducing operation further comprises:
   examining a source address of the DHCP OFFER;
   comparing an organizationally unique identifier (OUI) from the source address to a list of Organizationally Unique Identifiers; and
   based on the comparison, determining a manufacturer of the upstream NAT device.

4. The apparatus of claim 1, further comprising an operation of:
   storing a list of Organizationally Unique Identifiers wherein:
   each organizationally unique identifier includes the first three bytes of a source address; and
   each organizationally unique identifier identifies a manufacturer of networking devices.

5. The apparatus of claim 1, wherein the deducing operation further comprises:
   attempting to discover consumer grade services available from the upstream NAT device; and
   based on whether consumer grade services are discovered, making a deduction about whether the upstream NAT is deployed by a consumer grade NAT device.

6. The apparatus of claim 1, wherein the determining operation further comprises:
   bridging only when relatively certain, based on assigning relative certainties, that the upstream device is a consumer grade device and not a Large Scale NAT device.

7. The apparatus of claim 1, wherein the deducing operation further comprises:
   examining an IP address offered in the DHCP OFFER;
   in response to the IP address received from the upstream NAT device being in a 16-bit block of a standard for IP addresses, assigning a relative certainty that the upstream NAT device is a consumer grade device; and
   in response to the IP address received from the upstream NAT device being in a 20 or 24-bit block of a standard for IP addresses, assuming that the upstream NAT device is a Large Scale NAT device until relatively certain, based on assigning relative certainties, that the upstream device is not a Large Scale NAT device.

8. An electronic processor-implemented method comprising:
   broadcasting a Dynamic Host Control Protocol (DHCP) DISCOVER packet to an upstream network;
   receiving a DHCP OFFER from an upstream Network Address Translation (NAT) device in response to the DHCP DISCOVER packet;
   deducing attributes of the upstream NAT device with assistance of information from the received DHCP OFFER; and
   determining, based on making a deduction, according to the deduced attributes, about whether the upstream NAT device is a consumer NAT device or a Large Scale NAT device, whether or not to configure the electronic processor to turn off Network Address Translation and bridge to the upstream network.

9. The method of claim 8, wherein deducing further comprises:
   examining a source address of the DHCP OFFER and an IP address offered in the DHCP OFFER; and
   based on the examination, making a deduction about whether the upstream NAT device is a consumer NAT device or a Large Scale NAT device.

10. The method of claim 8, wherein deducing further comprises:
    examining a source address of the DHCP OFFER;
    comparing an organizationally unique identifier (OUI) from the source address to a list of Organizationally Unique Identifiers; and
    based on the comparison, determining a manufacturer of the upstream NAT device.

11. The method of claim 8, further comprising:
    storing a list of Organizationally Unique Identifiers wherein:
    each organizationally unique identifier includes the first three bytes of a source media access control (MAC) address; and
    each organizationally unique identifier identifies a manufacturer of networking devices.

12. The method of claim 8, wherein deducing further comprises:
    attempting to discover consumer grade services available from the upstream NAT device; and
    based on whether consumer grade services are discovered, making a deduction about whether the upstream NAT is deployed by a consumer grade NAT device.

13. The method of claim 8, wherein determining further comprises:
    bridging only when relatively certain, based on assigning relative certainties, that the upstream device is a consumer grade device and not a Large Scale NAT device.

14. The method of claim 8, wherein deducing further comprises:
    examining an IP address offered in the DHCP OFFER; and
    in response to the IP address received from the upstream NAT device being in a 16-bit block of a standard for IP addresses, assigning a relative certainty that the upstream NAT device is a consumer grade device.

15. The method of claim 8, wherein deducing further comprises:
  examining an IP address offered in the DHCP OFFER; and
  in response to the IP address received from the upstream NAT device being in a 20 or 24-bit block of a standard for IP addresses, assuming that the upstream NAT device is a Large Scale NAT device until relatively certain, based on assigning relative certainties, that the upstream device is not a Large Scale NAT device.

16. A computer program product comprising a non-transitory computer readable medium having computer readable and executable code for instructing a processor to perform a method, the method comprising:
  broadcasting a Dynamic Host Control Protocol (DHCP) DISCOVER packet to an upstream network;
  receiving a DHCP OFFER from an upstream Network Address Translation (NAT) device in response to the DHCP DISCOVER packet;
  deducing attributes of the upstream NAT device with assistance of information from the received DHCP OFFER; and
  determining, based on making a deduction, according to the deduced attributes, about whether the upstream NAT device is a consumer NAT device or a Large Scale NAT device, whether or not to configure the processor to turn off Network Address Translation and bridge to the upstream network.

17. The computer program product of claim 16, wherein deducing further comprises:
  examining a source address of the DHCP OFFER;
  comparing an organizationally unique identifier (OUI) from the source address to a list of Organizationally Unique Identifiers;
  based on the comparison, determining a manufacturer of the upstream NAT device; and
  based on the manufacturer determination, making a deduction about whether the upstream NAT device is a consumer NAT device or a Large Scale NAT device.

18. The computer program product of claim 16, wherein deducing further comprises:
  attempting to discover consumer grade services available from the upstream NAT device; and
  based on whether consumer grade services are discovered, making a deduction about whether the upstream NAT is deployed by a consumer grade NAT device.

19. The computer program product of claim 16, wherein determining further comprises:
  bridging only when relatively certain, based on assigning relative certainties, that the upstream device is a consumer grade device and not a Large Scale NAT device.

20. The computer program product of claim 16 wherein deducing further comprises:
  examining an IP address offered in the DHCP OFFER;
  in response to the IP address received from the upstream NAT device being in a 16-bit block of a standard for IP addresses, assigning a relative certainty that the upstream NAT device is a consumer grade device; and
  in response to the IP address received from the upstream NAT device being in a 20 or 24-bit block of a standard for IP addresses, assuming that the upstream NAT device is a Large Scale NAT device until relatively certain, based on assigning relative certainties, that the upstream device is not a Large Scale NAT device.

* * * * *